Figure 1:
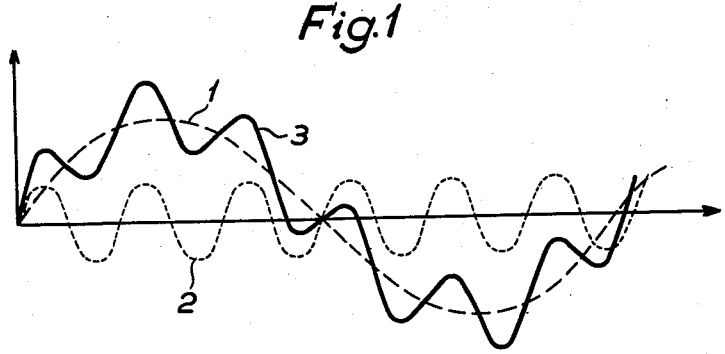

Nov. 12, 1963   O. LINDSTROM   3,110,568
EXTRACTION APPARATUS
Filed Aug. 22, 1960

INVENTOR.
Olle Lindstrom
BY
Bailey, Stephens Huettig
ATTORNEYS

United States Patent Office 3,110,568
Patented Nov. 12, 1963

3,110,568
EXTRACTION APPARATUS
Olle Lindstrom, Vasteras, Sweden, assignor to Allmänna Svenska Elektriska Aktiebolaget, Vasteras, Sweden, a Swedish corporation
Filed Aug. 22, 1960, Ser. No. 51,042
Claims priority, application Sweden Sept. 7, 1959
1 Claim. (Cl. 23—270.5)

Extraction with organic solvents has recently become of great industrial significance. These processes are thus used in the petroleum industry and in the nuclear energy industry, among other things for processing nuclear fuel for the recovery of plutonium, uranium or thorium. The extraction process has had great success in the reprocessing of nuclear fuel, mainly because of the high decontamination effect.

The costs of these cleaning plants, however, are very high in spite of the relatively simply basic process. The reason for this is the special technique which must be used because of the risks associated with the radioactive radiation which is emitted from the fission products in the nuclear fuel. Considerable plant costs therefore arise since the chemical apparatus must be constructed in tight cells surrounded by thick concrete walls in order to dampen the radioactive radiation. Further, apparatus and arrangements are required for remote control and remote supervision and for replacement or repair of damaged apparatus details by remote technique. It has been found that the total plant costs of these reprocessing plants, to a great extent, are proportional to the "shielded volume" i.e. the building volume which houses the active parts of the apparatus and which must therefore be equipped with biological protection. The most important method of reducing the plant costs, and consequently also the process costs since these are dependent almost entirely upon the plant costs, is to endeavour to reduce the "shielded volume." An attempt to obtain lower construction costs by means of more compact apparatus construction therefore constitutes a development in this sphere. To a large extent extraction apparatus for this purpose can be divided into two classes, pulsed columns and mixer-settler apparatus. The pulsed column is characterised in that the contents of the column is subjected to a pulsing movement which is superimposed on a net transport of both the liquid phases moving in counter current flow through the column. The pulsed column is generally provided with perforated or slit bottoms through which the liquid-dispersion is forced to and fro during the pulsing so that a good contact is established between the two liquid phases. The pulsed columns are considerably shorter than earlier used conventional packed columns without pulsing, but even so, are often 10 metres high in fullsize constructions. The mixer-settler apparatus do not require much space as regards height, but a large floor surface, and have the drawback that they are considerably more complicated mechanically than pulsed columns. A mixer-settler unit consists of a mixing chamber (mixer) and a separation chamber (settler). In the mixing chamber, the two liquid phases are thoroughly mixed with the help, for example, of a motor driven stirrer, after which the mixture is re-separated in the separation chamber. Such a mixer-settler unit often more or less corresponds to a theoretical step in the separation process.

The advantages of the pulsed column and mixer-settler apparatus are combined in the series-connected pulsed column, the so-called ASEA-column, which is characterised in that a pulsed column, constructed in a known manner, is divided into a number of smaller column elements which are connected to each other in series by means of conduits the volume content of which in each link of communication is less than or of the same order of magnitude as the pulse volume. By link of communication is meant that connecting conduit or those connecting conduits functionally connected in parallel, which connect two successive vessels. By pulse volume is meant the volume which is displaced at one pulse beat. The mechanical energy which is supplied during pulsing in order to create an effective contact between the two liquid phases also causes at this column a transport of the two phases in respective directions between the column elements. This construction thus combines the operating method and great efficiency of the pulsed column with the compact construction of the mixer-settler apparatus. The floor space which is required for the series-connected pulsed column is, however, considerably smaller than for a corresponding conventional mixer-settler apparatus with the same capacity.

The ASEA-column also reveals several other advantages. The division into column elements produces a significant flexibility, so that in a relatively simple way, the number of column elements may be decreased or increased according to the requirements of the process, which is not possible with conventional pulsed columns. Formation of channels, which is a problem particularly with larger columns, is eliminated by the mixing which takes place in the connecting conduits between the column elements. The starting operation after a stoppage is simple since separation of the two liquid phases occurs within each column element without any transference between the elements taking place. At the starting operation in a conventional simple pulsed column an almost complete separation occurs, with the consequential difficulties. The pulsing pump works against a considerably lower hydro-static pressure than with a straight column, so that the stresses on it are considerably less. Further, complete continuous extraction apparatus can be constructed, whereby for example, extraction washing, re-extraction and cleaning of the extraction medium occurs in a continuous sequence with the help of the same pulsing arrangement. This simplifies the regulation of the process and saves auxiliary apparatus and intermediate containers.

The condition that the pulse volume shall be of the same magnitude or larger than the volume of each link of communication so that an efficient transference of both the phases between the column elements shall take place obviously entails a certain limitation of the general use of the construction. Because a single pulse regulates the transference between the column elements as well as the extraction efficiency, optimum conditions in available apparatus can only be obtained for both processes with certain liquid pairs. For extraction with other liquid pairs, it can happen that the transference regulated pulse does not give good extraction efficiency. When dimensioning the apparatus, it is further necessary to select a relatively large number of short column elements because for the same pulse volume long column elements have a reduced cross sectional area in the connection conduits and also a great pressure drop and risk of emulsifying. In such cases where there is not the floor space required for this method of procedure, such a resource cannot be resorted to in order to achieve optimum extraction result.

Despite the great advance which the production coming into being of the series-coupled pulsed column entails because of its great advantages over previously known constructions such as the simple pulsed column, or the mixer-settler apparatus, the above mentioned circumstances undoubtedly set a limit to the usableness. The present invention solves this problem of the limited usableness in a surprisingly simple manner so that complete freedom now exists as to dimensioning and construction of this type of extraction apparatus.

The invention is characterised in that the liquid content in the vessels, often column elements, being integral parts of the extraction apparatus and series-connected in a known manner, is made of pulsate with the help of at least two pulsing devices, one of which is mainly responsible for the liquid transference between the vessels, this pulse volume being of the same size or larger than the volume in the separate links of communication, while the second, or other pulsing devices have a frequency and pulsing volume merely suited to the actual progress of the extraction. That or those pulsing devices bringing about the main extraction effect thereby have an essentially higher frequency and lower amplitude than that pulsing device mainly attending to transport. For the sake of simplicity, in the following will be discussed an apparatus with only two pulsing devices, of which the one which is provided for the transference of liquid between the vessels is called the transport pulsing device, and the one which is chiefly provided to accelerate the progress of the extraction is called the extraction pulsing device. In general, it should be sufficient to use one pulsing device for the extraction pulsing. Of course the mechanical energy supplied at the transport pulsing will also benefit the extraction.

Figure 2:
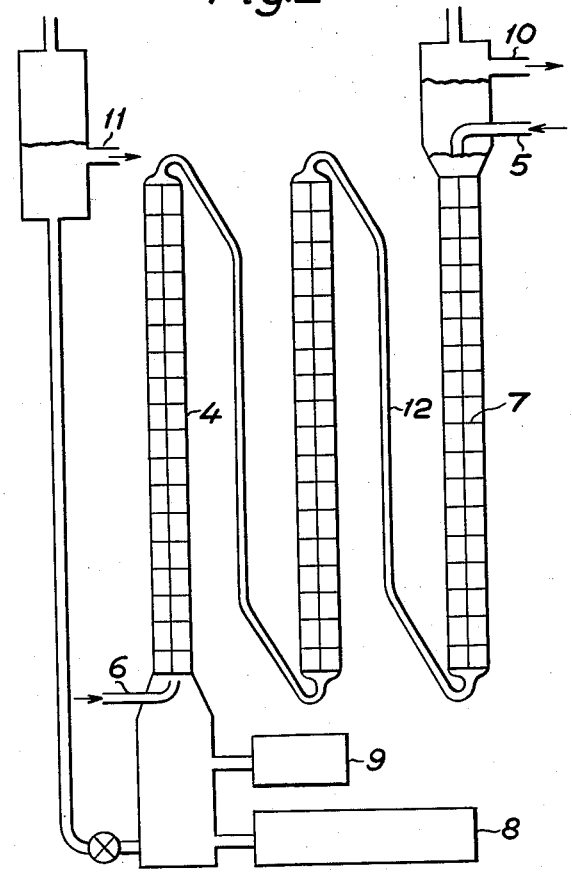

In the following the invention will be explained more in detail by way of example and with reference to the attached drawing in which FIGURE 1 shows pulses with a sine-shaped characteristic, and FIGURE 2 shows diagrammatically an extraction apparatus comprising three column elements connected in series and two pulsing devices.

The transport pulsing 1 occurs with a lower frequency and greater amplitude than the extraction pulsing 2, which is shown in FIGURE 1, in which the absciss represents the time and the ordinate the procession for a small liquid element in the oscillating liquid column. The resultant oscillating movement 3 is obtained by addition of these oscillating movements. For the transport pulsing, such a low frequency may be chosen that it would be rather ineffective in accelerating the progress of the extraction, but on the other hand, well suited for effective liquid transference between the vessels even if these are long elements and the connection ducts are narrow. The extraction pulse again can have a high frequency and low amplitude which corresponds to optimum extraction conditions. In many cases it is suitable to use a transport pulsing with a frequency of about 5-30 cycles/minute and an extraction pulsing with a frequency of about 40-200 cycles/minute.

As mentioned, FIGURE 1 shows the pulses with a sine-shaped characteristic, but no particular demands are made of the pulse-shape which may also have a different characteristic. FIGURE 2 represents the principle for the construction method according to the invention in which, by way of example, three series-connected column elements 4 are shown. During the extraction, for example, a component is extracted from a heavier solution which is introduced at 5, by a lighter organic solvent which is introduced at 6.

The pulsed column elements are provided with thin perforated bottoms 7. During the pulsing, both phases are forced to and fro through these perforated bottoms thus resulting in an efficient extraction. Both the pulsing devices are schematically indicated, 8 referring to the device for the transport pulsing and 9 to the device for the extraction pulse. Each such pulsing device can consist of a piston which operates in a cylinder with a forwards and backwards movement, or of a membrane. Often, particularly with radioactive solutions, the pulsing device does not operate directly on the column content, but an inert liquid or gas may act as intermediary. Particularly with the transport pulsing which is characterized by a low frequency and large pulse volume, it is often suitable to utilise a gas as intermediary, whereby the gas is compressed and expanded with the help of a piston or with the help of alternately connecting it to tanks containing gas of lower and higher pressure.

10 is a draining off pipe for the lighter component which is separated from the heavier component fed into the same container. The lighter component is fed in at 6. The heavier component is drained off at 11.

If only one pulsing device had been used, FIGURE 2 would obviously have comprised a schematical description of the principle for the above mentioned series-connected extraction column, whereby the pulsing would have acted both as extraction pulsing and transport pulsing according to the terminology applied above.

For dimensioning the column elements and connection conduits 12 and setting the frequency and amplitude of the transport pulsing it is not necessary, as was the case before, to take into consideration the effect of the transport pulsing on the progress of the extraction. Such a liquid-speed in the connection conduits has to be chosen that emulsifying cannot take place but so that the gas which may be in the system is carried along together with the light phase. The optimum liquid-speed in order to fulfill this requirement varies for system to system, but it is practically always possible to find such a suitable optimum liquid-speed. If the liquid-speed is increased successively, first such conditions arise that the gas is drawn in and carried through the connection ducts, and afterwards such conditions which cause both the liquid phases to emulsify. If it should be impossible to separate these two conditions, such a low liquid-speed may be chosen that emulsifying is avoided. The top of each separate column element should in such case be provided with ventilation means from which gas is continuously or spasmodically drawn off from the system.

The embodiment of the invention shown in FIGURE 2 has three column elements 4. For a pilot plant apparatus, described by way of example, the height of each element may be 960 mm. and the diameter 50 mm. The bottoms 7 may be manufactured from stainless steel and perforated with 120 holes 2 mm. in diameter, which gives a free area of 20.3%. The distance between the bottoms may be 25 mm. The length of the connection ducts may be 1020 mm. and their inner diameter 7.8 mm., which gives a volume of 49 cm.$^3$. The device 8 may produce a pulsing with the frequency 8 cycles/minute and the pulse volume 65 cm.$^3$. The device 9 may produce a pulsing with the frequency 45 cycles/minute and the pulse volume 10 cm.$^3$. Both the pulsing devices may be conventional membrane pumps. In the apparatus described above, uranium, for example, may be extracted from a nitric acid uranium nitrate solution containing 265 g. U/litre and 3 gram equivalents $HNO_3$/litre, with a solvent consisting of 30% tributyl phosphate and 70% photogen free from aromatic compounds. The first mentioned solution is introduced at 5 and the last mentioned at 6 in the apparatus according to FIGURE 2. During extraction with the said pair of liquids, the uranium is purified so that, for example the percentage of iron drops from 10% to 20 p.p.m.

A certain separation of the light and heavy components may be permitted in the connection ducts. This may, however, necessitate a somewhat increased pulse volume. Such a separation can also be prevented by suitable arrangements for effecting turbulence in the connection ducts. With very large columns, the connection ducts may also be provided with perforated bottoms.

It is also possible to use several functionally parallel-connected weaker connection ducts.

As far as the other shaping of the exemplified extraction apparatus is concerned, there are unlimited possibilities of exploiting established conventional technique. The same may be said of the selection of the height of the column elements and the frequency and amplitude of the extraction pulse. Thanks to the invention, which comprises a considerable improvement of the previously mentioned series-connected pulsed columns, such freedom and flexibility of construction and dimension of these extraction apparatus has been gained that it is possible in each special case to reach an optimum dimensioning with consideration to the special requirements of the process. It is possible, namely, that for example the height of the shielded part of the fuel reprocessing plant is determined by another apparatus, for example, evaporator, whereas the column elements are suitably dimensioned with the same height so that minimum floor surface, and consequently minimum shielded volume, is obtained. Because the extraction pulse does not have to take into consideration the transference between the column elements, there is also complete freedom to vary the conditions without alterations to the apparatus. These advantages mean considerably reduced construction cost in reprocessing works. It is not necessary that all vessels in the apparatus are column elements provided with contact bottoms. Some vessels can also be e.g. similar elements without bottoms and acting as hold-up vessels.

However, the advantages are also of importance within other chemical techniques, for example, within the petroleum industry or within the pharmaceutical industry. Besides liquid-liquid extraction, it is also possible to use this apparatus for gas-liquid systems, for example gas washing, etc.

I claim:

Apparatus for liquid-liquid extraction of a heavy phase and a light phase in countercurrent flow, said heavy phase and said light phase being substantially immiscible, comprising a plurality of series connected vessels, inlet and outlet means for the heavy and light phases respectively at the ends of the apparatus, a first pulsing means, means connecting the upper part of the first of two consecutive vessels to the lower part of the second vessel, said connecting means comprising at least one open connection line common to both phases, said line being capable of transmitting liquid in both directions, the lower part of the second vessel being located below the said upper part of the first vessel, the volume of each connecting means being not greater than approximately the volume which is displaced therethrough at one stroke of said first pulsing means, and a second pulsing means having a substantially higher frequency and a lower amplitude than said first pulsing means for increasing the extraction efficiency of the extraction apparatus, said first pulsing means primarily producing transfer of the phases between the vessels and said second pulsing means primarily improving the extraction.

References Cited in the file of this patent

UNITED STATES PATENTS

| | | |
|---|---|---|
| 2,023,546 | Pummill | Dec. 10, 1935 |
| 2,048,820 | Schmid | July 28, 1936 |
| 2,811,423 | Bradley | Oct. 29, 1937 |

OTHER REFERENCES

Jealous and Lieberman: "The Concatenated Pulse Column," Chemical Engineering Progress, Sept. 1956, pages 366–370.

Sage and Woodfield: "Pulse Column Variables," Chemical Engineering Progress, Aug. 1954, pages 396–408.